United States Patent
Nilsson et al.

(10) Patent No.: US 9,587,894 B2
(45) Date of Patent: Mar. 7, 2017

(54) HEAT EXCHANGER EFFLUENT COLLECTOR

(71) Applicant: ALSTOM Technology Ltd, Baden (CH)

(72) Inventors: Lars Peter Nilsson, Växjö (SE); Friedrich Weyland, Wiesloch (DE)

(73) Assignee: General Electric Technology GmbH, Baden (CH)

( * ) Notice: Subject to any disclaimer, the term of this patent is extended or adjusted under 35 U.S.C. 154(b) by 535 days.

(21) Appl. No.: 14/153,157

(22) Filed: Jan. 13, 2014

(65) Prior Publication Data

US 2015/0198392 A1    Jul. 16, 2015

(51) Int. Cl.
| | |
|---|---|
| *F28D 17/00* | (2006.01) |
| *F28G 1/12* | (2006.01) |
| *F28G 9/00* | (2006.01) |
| *F28D 19/04* | (2006.01) |
| *B23P 15/26* | (2006.01) |
| *F28G 15/08* | (2006.01) |
| *F28G 1/16* | (2006.01) |

(52) U.S. Cl.
CPC .............. *F28G 9/005* (2013.01); *B23P 15/26* (2013.01); *F28D 19/044* (2013.01); *F28D 19/045* (2013.01); *F28G 1/163* (2013.01); *F28G 15/08* (2013.01); *Y10T 29/49357* (2015.01)

(58) Field of Classification Search
CPC .......... F28G 9/005; F28G 15/08; F28G 1/163; F28D 19/045; F28D 19/044; B23P 15/26; Y10T 29/49337
USPC ............................................ 165/4, 5, 6, 8, 95
See application file for complete search history.

(56) References Cited

U.S. PATENT DOCUMENTS

| | | | |
|---|---|---|---|
| 2,940,736 A | 5/1950 | Ödman | |
| 2,596,642 A | 5/1952 | Boestad | |
| 2,949,282 A * | 8/1960 | Kirkby | ...................... C10B 43/02 |
| | | | 122/379 |
| 4,396,058 A | 8/1983 | Kurschner et al. | |
| 4,428,417 A * | 1/1984 | Chesner | ................... F28G 9/005 |
| | | | 165/5 |
| 4,553,458 A | 11/1985 | Schoonover | |
| 4,744,410 A | 5/1988 | Groves | |
| (Continued) | | | |

FOREIGN PATENT DOCUMENTS

| | | |
|---|---|---|
| DE | 34 36 802 A1 | 4/1986 |
| EP | 2 051 033 A1 | 4/2009 |
| (Continued) | | |

*Primary Examiner* — Len Tran
*Assistant Examiner* — Claire Rojohn, III
(74) *Attorney, Agent, or Firm* — GE Global Patent Operation; Rita D. Vacca

(57) ABSTRACT

A gas to gas heat exchanger 110 is equipped with a heat transfer element cleaning system 160, effluent collector hopper 162 and effluent collector hopper cleaning system 164. The heat transfer element cleaning system 160 is useful to remove accumulated substances from the heat exchanger 110 heat transfer elements 134. The effluent collector hopper 162 is useful to capture a cleaning fluid used to remove accumulated substances from the heat exchanger 110 heat transfer elements 134. The effluent collector hopper cleaning system 164 is useful to remove accumulated substances captured with the cleaning fluid from the effluent collector hopper 162 to prevent clogging thereof.

5 Claims, 5 Drawing Sheets

(56) References Cited

U.S. PATENT DOCUMENTS

| | | | |
|---|---|---|---|
| 4,815,523 A * | 3/1989 | Dehli | F28G 1/16 134/102.1 |
| 4,903,756 A | 2/1990 | Monro | |
| 5,044,424 A * | 9/1991 | Monro | B01D 53/504 165/10 |
| 5,366,561 A * | 11/1994 | Ginn | B08B 3/024 134/18 |
| 5,397,548 A * | 3/1995 | Kritzler | B01D 53/8631 165/5 |
| 5,443,113 A | 8/1995 | Mulholland et al. | |
| 5,626,184 A * | 5/1997 | Campbell | F28G 3/16 165/5 |
| 5,836,379 A | 11/1998 | Counterman | |
| 5,875,833 A * | 3/1999 | Schluter | F28G 9/005 15/318 |
| 5,899,261 A | 5/1999 | Brzytwa et al. | |
| 6,019,160 A | 2/2000 | Chen | |
| 6,065,528 A * | 5/2000 | Fierle | F28G 9/005 165/5 |
| 6,096,279 A | 8/2000 | Iwashita et al. | |
| 6,203,598 B1 | 3/2001 | Hasegawa et al. | |
| 2010/0012291 A1 * | 1/2010 | Sporie | F24F 5/0035 165/61 |
| 2011/0005706 A1 * | 1/2011 | Thomas | F28D 19/044 165/5 |

FOREIGN PATENT DOCUMENTS

| | | |
|---|---|---|
| GB | 789971 | 1/1958 |
| GB | 2376060 | 12/2002 |
| JP | S61195296 A | 8/1986 |
| JP | 2002361035 A2 | 12/2002 |
| WO | WO90/01137 | 2/1990 |
| WO | WO99/14543 | 3/1999 |
| WO | 86/06464 A1 | 1/2011 |

* cited by examiner

HEAT EXCHANGER EFFLUENT COLLECTOR

FIELD OF THE DISCLOSURE

The present disclosure relates to a heat exchanger effluent collector and to methods of manufacturing and using the heat exchanger effluent collector. More specifically, the present disclosure relates to a regenerative gas to gas heat exchanger effluent collector associated with a flue gas treatment system, to methods of regenerative gas to gas heat exchanger effluent collector manufacture and to methods of regenerative gas to gas heat exchanger effluent collector use for increased flue gas treatment system efficiency and decreased associated costs.

BACKGROUND OF THE DISCLOSURE

Gas to gas heat exchangers (GGH) are commonly used in combustion plant desulfurization systems to transfer heat from untreated relatively hot flue gas to treated relatively cooler flue gas. A conventional rotary gas to gas heat exchanger 10, such as that illustrated in FIG. 1 includes a rotor 12 mounted within an interior 14a of a housing 14. The housing 14 defines an untreated flue gas inlet duct 16 and an untreated flue gas outlet duct 18 for a flow represented by arrow 20 of untreated flue gas FG through the heat exchanger 10. The housing 14 further defines a treated flue gas inlet duct 22 and a treated flue gas outlet duct 24 for a flow represented by arrow 26 of treated flue gas TG through the heat exchanger 10. The rotor 12 includes a plurality of radial partitions 28 or diaphragms defining compartments 30 therebetween for element supporting baskets (frames) 32 of heat transfer elements 34. The rotary gas to gas heat exchanger 10 is divided into a treated flue gas sector 38 and an untreated flue gas sector 36 by sector plates 40, which extend across to "cap" open top end 42 and open bottom end 44 of housing 14 to partially enclose rotor 12 within interior 14a of housing 14.

FIG. 2 illustrates an element supporting basket 32 including a few heat transfer elements 34 stacked therein. While only a few heat transfer elements 34 are illustrated in FIG. 2 for purposes of clarity, it will be appreciated that interior 32a of the element supporting basket 32 will typically be filled with multiple heat transfer elements 34. As such, heat transfer elements 34 are closely stacked in a spaced relationship within interior 32a of element supporting basket 32 to form passageways 46 between the heat transfer elements 34 for the flow of untreated flue gas FG or treated flue gas TG therethrough.

Referring to FIGS. 1 and 2, the untreated hot flue gas FG has a flow 20 through the untreated gas sector 36 of the heat exchanger 10 transferring heat to the heat transfer elements 34 on the continuously rotating rotor 12. The heat transfer elements 34 in element supporting baskets 32 rotate about axis 48, illustrated by arrow 50, out of untreated flue gas sector 36 and into the treated flue gas sector 38 of the heat exchanger 10. In treated flue gas sector 38, treated flue gas TG has a flow 26 between the heat transfer elements 34. Treated flue gas TG is thereby heated by heat transfer elements 34. In other forms of heat exchangers 10, the heat transfer elements 34 remain stationary while the untreated flue gas inlet duct 16/untreated flue gas outlet duct 18 and treated flue gas inlet duct 22/treated flue gas outlet duct 24 of housing 14 rotate. For examples of other heat transfer elements 34, reference is made to U.S. Pat. Nos. 2,596,642; 2,940,736; 4,396,058; 4,744,410; 4,553,458; and 5,836,379.

During operation of gas to gas heat exchanger 10, the heat transfer elements 34 in the element supporting baskets 32 accumulate fly ash and substances, such as for example heavy metals, carbon, sulfuric acid, lime, limestone and like substances, onto the surfaces thereof from the flue gas streams. The increasing accumulation of substances on the surfaces of the heat transfer elements 34 in the element supporting baskets 32 causes a corresponding increasing pressure drop over the heat exchanger 10. Removal of accumulated substances from the heat transfer elements 34 in the elemental supporting baskets 32 is typically accomplished using a high pressure water wash. Cleaning or removal of accumulated substances from the surfaces of the heat transfer elements 34 correspondingly eliminates the above-noted pressure drop over the heat exchanger 10. Thus, removal of accumulated substances from surfaces of the heat transfer elements 34, returns heat exchanger 10 flow pressure to pre-substance accumulation levels. However, during the process of cleaning the heat transfer elements 34 to remove accumulated substances therefrom, removed accumulated substances become re-entrained and re-enter the flue gas stream. As such, the re-entrained accumulated substances from the gas to gas heat exchanger 10 enter and are at least in part collected in possibly an associated sea water flue gas desulfurization scrubber (not shown) arranged downstream with respect to the flow of untreated flue gas FG from the gas to gas heat exchanger 10. From the sea water flue gas desulfurization scrubber, the accumulated substances, including for example heavy metals, carbon, sulfur compounds, and like substances, enter an associated sea water treatment plant and potentially discharged to the sea. A solution to reduce or eliminate accumulated substances from the gas to gas heat exchanger 10 becoming re-entrained in the flue gas stream and potentially discharged to the environment is needed.

Thus, there is a need for a gas to gas heat exchanger with heat transfer elements that may be cleaned of accumulated substances to provide decreased pressure drop for a given amount of heat transfer without the dislodged or removed accumulated substances from the gas to gas heat exchanger becoming re-entrained in the flue gas stream and potentially discharged to the environment.

SUMMARY

Illustrated in FIGS. 3-5, the present disclosure is directed to a gas to gas heat exchanger 110 equipped with element supporting baskets 132, heat transfer elements 134, heat transfer element cleaning system 160, effluent collector hopper/tray 162, and effluent collector hopper cleaning system 164. Likewise, the present disclosure provides a method of making the subject gas to gas heat exchanger 110 equipped with element supporting baskets 132, heat transfer elements 134, heat transfer element cleaning system 160, effluent collector hopper/tray 162, and effluent collector hopper cleaning system 164, and a method of using the subject gas to gas heat exchanger 110 equipped with element supporting baskets 132, heat transfer elements 134, heat transfer element cleaning system 160, effluent collector hopper/tray 162, and effluent collector hopper cleaning system 164.

The subject gas to gas heat exchanger 110 has many features common to the prior art heat exchanger described above and illustrated in FIG. 1. Accordingly, for purposes of clarity, common features of FIG. 3 to those of FIG. 1 have like reference numbers to those of FIG. 1 preceded by the number "1".

As previously noted, the subject gas to gas heat exchanger 110 includes element supporting baskets 132 with a plurality of heat transfer elements 134. The heat transfer elements 134 are arranged within the element supporting baskets 132. The heat transfer elements 134 are shaped to define the spacing between the heat transfer elements 134 and serve to close and define channels or passageways 146 therebetween formed by contact between the heat transfer elements as described in greater detail below. Contact between heat transfer elements 134 is minimized to maximize heat transfer area or surfaces. The subject gas to gas heat exchanger 110 at least maintains heat transfer rates as compared to that of the prior art described above, while significantly reducing pressure drop and reducing accumulated substance re-entrainment and potential sea discharge, thereby reducing costs and improving performance efficiency thereof.

In summary, the subject gas to gas heat exchanger 110 comprises element supporting baskets 132 each supporting a plurality of heat transfer elements 134. The heat transfer elements 134 are fabricated to define the spacing between the heat transfer elements 134, and serve to form closed passageways 146 therebetween for fluid FG/TG flow therethrough. Downstream with respect to the flow of untreated flue gas FG through the subject gas to gas heat exchanger 110 is a heat transfer element cleaning system 160, effluent collector hopper/tray 162 and an effluent collector hopper cleaning system 164. The heat transfer element cleaning system 160 is used to remove accumulated substances from the surfaces 134a of the heat transfer elements 134 thus avoiding a pressure drop as caused thereby. Associated with the heat transfer element cleaning system 160 is an effluent collector hopper/tray 162 for collection of the accumulated substances cleaned or removed from the surfaces 134a of the heat transfer elements 134. The effluent collector hopper/tray 162 is likewise equipped with a hopper cleaning system 164 for effluent collector hopper/tray 162 cleaning and prevention of effluent collector hopper/tray 162 clogging.

A method of making a gas to gas heat exchanger 110 including the above-described features is also provided. The method comprises providing a gas to gas heat exchanger 110 equipped with element supporting baskets 132, and heat transfer elements 134 fabricated and sized from rigid material sheets for support within the element supporting baskets 132. The fabricated heat transfer elements 134 are arranged within the element supporting baskets 132 with a defined spacing between the heat transfer elements 134 to form closed passageways 146 for fluid FG/TG flow therethrough. Provided downstream with respect to the flow of untreated flue gas FG through the gas to gas heat exchanger 110 is a heat transfer element cleaning system 160, effluent collector hopper/tray 162, and effluent collector hopper cleaning system 164. The heat transfer element cleaning system 160 is used to remove accumulated substances from the surfaces 134a of the heat transfer elements 134 thus reducing or avoiding any pressure drop otherwise caused thereby. Associated with the heat transfer element cleaning system 160 is an effluent collector hopper/tray 162 for collection of the accumulated substances cleaned or removed from the surfaces 134a of the heat transfer elements 134. The effluent collector hopper/tray 162 is likewise equipped with an effluent collector hopper cleaning system 164 for cleaning of effluent collector hopper/tray 162 and prevention of effluent collector hopper/tray 162 clogging.

Still further, a method of using a gas to gas heat exchanger 110 is provided comprising providing a gas to gas heat exchanger 110 equipped with element supporting baskets 132. Within the element supporting baskets 132, heat transfer elements 134 are arranged to form closed passageways 146 for fluid FG/TG flow therethrough. As such, fluid FG/TG flows through the closed passageways 146 to transfer heat from untreated flue gas FG to treated flue gas TG. Provided downstream with respect to the flow of untreated flue gas FG through the gas to gas heat exchanger 110 is a heat transfer element cleaning system 160, effluent collector hopper/tray 162, and effluent collector hopper cleaning system 164. The heat transfer element cleaning system 160 is used to remove accumulated substances from the surfaces 134a of the heat transfer elements 134 thus reducing or avoiding any pressure drop otherwise caused thereby. Associated with the heat transfer element cleaning system 160 is an effluent collector hopper/tray 162 for collection of the accumulated substances cleaned or removed from the surfaces 134a of the heat transfer elements 134. The effluent collector hopper/tray 162 is likewise equipped with an effluent collector hopper cleaning system 164 to prevent effluent collector hopper/tray 162 clogging.

Further objects and features of the subject gas to gas heat exchanger 110 and methods associated therewith will be apparent from the following detailed description and claims.

BRIEF DESCRIPTION OF THE DRAWINGS

The subject gas to gas heat exchanger 110 with heat transfer element cleaning system 160, effluent collector hopper/tray 162 and effluent collector hopper cleaning system 164 is disclosed in more detail below with reference to the appended drawings wherein.

DETAILED DESCRIPTION

Figure 1:
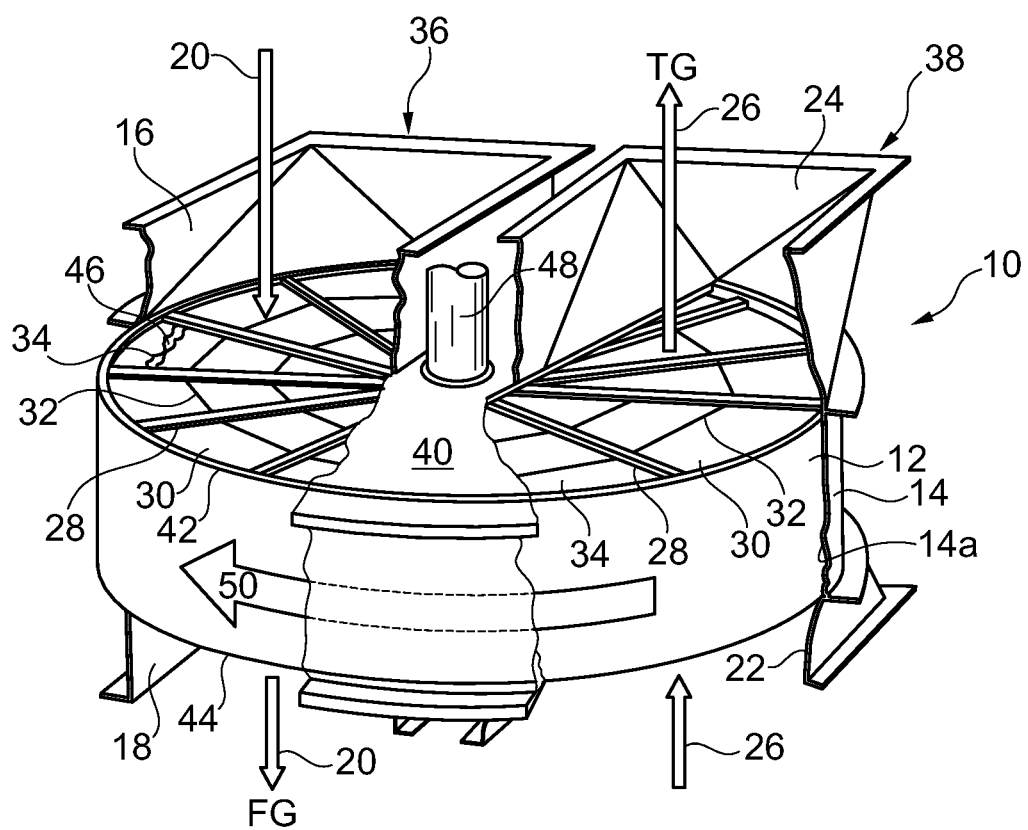
FIG. 1 is a partially broken away schematic perspective view of a prior art gas to gas heat exchanger.
Figure 2:
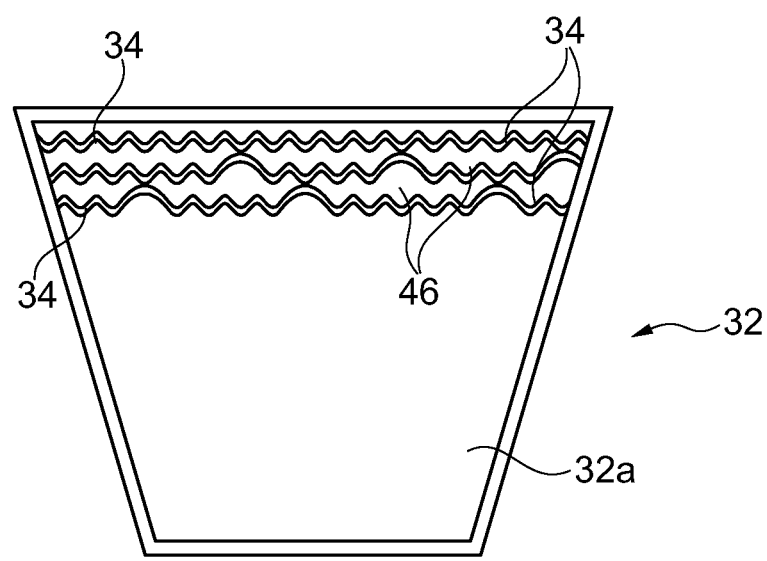
FIG. 2 is a schematic top plan view of a prior art element supporting basket including a few heat transfer elements.

As noted above, FIG. 1 illustrates a prior art gas to gas heat exchanger 10 equipped with element supporting baskets 32. Illustrated in FIG. 2 is an element supporting basket 32 depicted as including only a few heat transfer elements 34 for purposes of clarity.

Figure 3:
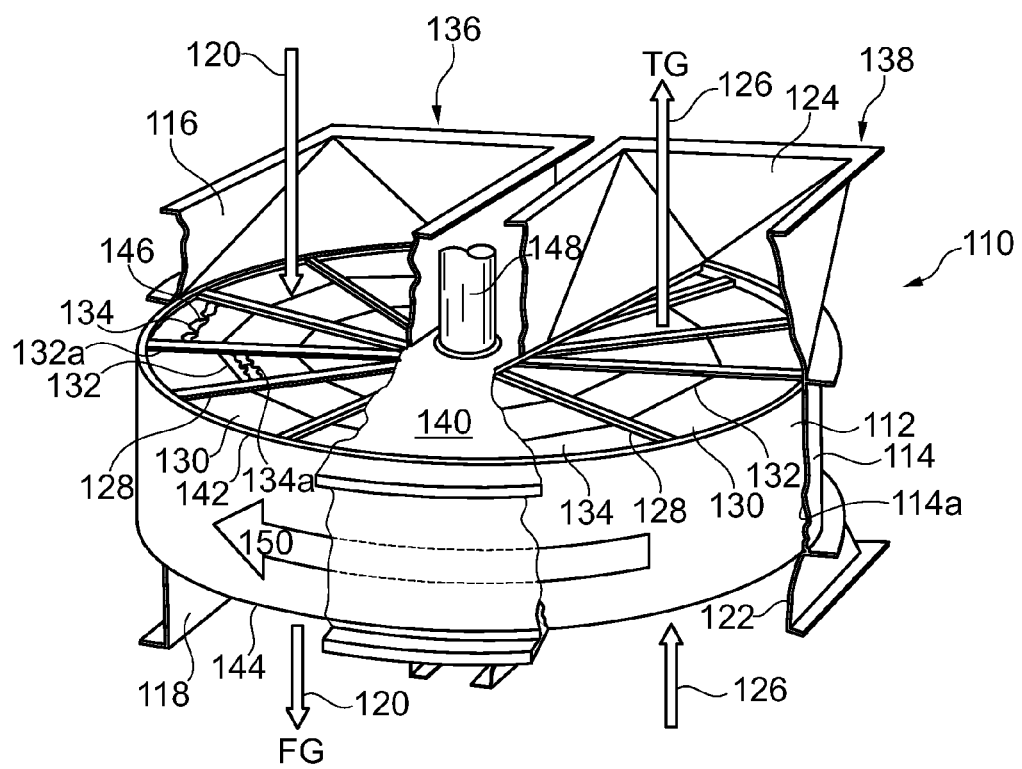
FIG. 3 is a partially broken away schematic perspective view of a gas to gas heat exchanger 110 according to the subject disclosure.

Illustrated in FIG. 3, is the present gas to gas heat exchanger 110. As noted above, the subject gas to gas heat exchanger 110 has many features common to the prior art heat exchanger described above and illustrated in FIG. 1. Accordingly, for purposes of clarity, common features of FIG. 3 to those of FIG. 1 have like reference numbers to those of FIG. 1 preceded by the number "1".

The present gas to gas heat exchanger 110 is used to transfer heat from untreated hot combustion flue gas FG to treated flue gas TG to cool the untreated flue gas FG prior to treatment thereof. Gas to gas heat exchanger 110, hereinafter referred to as "exchanger 110", includes a rotor 112 mounted within an interior 114a of a housing 114. The housing 114 defines an untreated flue gas inlet duct 116 and an untreated flue gas outlet duct 118 for a flow represented by arrow 120 of untreated flue gas FG through the exchanger 110. The housing 114 further defines a treated flue gas inlet duct 122 and a treated flue gas outlet duct 124 for a flow represented by arrow 126 of treated flue gas TG through the exchanger 110. The rotor 112 includes a plurality of radial partitions 128 or diaphragms defining compartments 130 therebetween for element supporting baskets (frames) 132 for heat transfer elements 134 support. The exchanger 110 is divided into a treated flue gas sector 138 and an untreated flue gas sector 136 by sector plates 140, which extend across to "cap" open top end 142 and open bottom end 144 of housing 114 to partially enclose rotor 112 within interior 114a of housing 114.

Still referring to FIG. 3, the hot untreated flue gas FG has a flow 120 through the gas sector 136 of the exchanger 110 transferring heat to the heat transfer elements 134 on the continuously rotating rotor 112. The heat transfer elements 134 in interior 132a of element supporting baskets 132 rotate about axis 148, illustrated by arrow 150, out of untreated flue gas sector 136 and into treated flue gas sector 138 of the exchanger 110. In treated flue gas sector 138, treated flue gas TG has a flow 126 between the heat transfer elements 134. Treated flue gas TG is thereby heated by heat transfer elements 134. In other forms of gas to gas heat exchangers, the heat transfer elements 134 remain stationary while the untreated flue gas inlet duct 116/untreated flue gas outlet duct 118 and treated flue gas inlet duct 122/treated flue gas outlet duct 124 of housing 114 rotate. As noted, the present exchanger 110 is equipped with element supporting baskets 132 for support of a plurality of heat transfer elements 134 having surfaces 134a. Typically, each element supporting basket 132 supports approximately 50 to approximately 200 heat transfer elements 134. However, for purposes of clarity, element supporting basket 132 is illustrated in FIG. 3 with but a few heat transfer elements 134.

Figure 4:
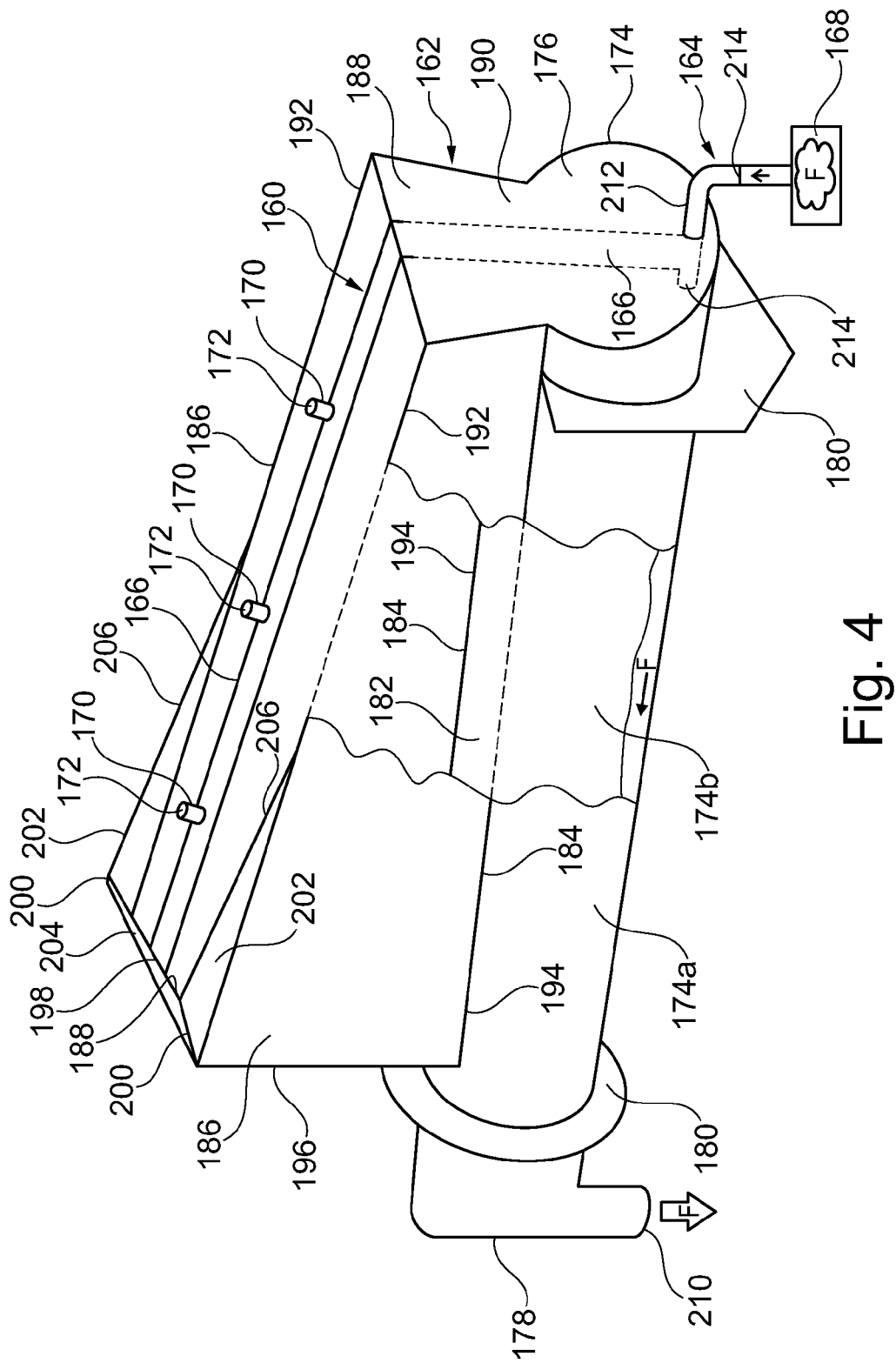
FIG. 4 is a partially broken away schematic perspective view of a heat transfer element cleaning system 160, effluent collector hopper 162 and effluent collector hopper cleaning system 164 according to the subject disclosure.

Illustrated in FIG. 4 is the subject heat transfer element cleaning system 160, effluent collector hopper 162 for collection of the accumulated substances cleaned or removed from the surfaces 134a of the heat transfer elements 134, and effluent collector hopper cleaning system 164 for cleaning of effluent collector hopper 162 and prevention of effluent collector hopper 162 clogging. The heat transfer element cleaning system 160 includes a pipe 166 fluidly connected to effluent collector hopper cleaning system 164. Via effluent collector hopper cleaning system 164, pipe 166 is fluidly connected to a fluid supply source 168. Fluid supply source provides a cleaning fluid F, such as water, to both the heat transfer element cleaning system 160 and the effluent collector hopper cleaning system 164. Alternatively, pipe 166 of heat transfer element cleaning system 160 may be fluidly connected to a separate dedicated fluid supply source (not shown) other than fluid supply source 168. In such a case, pipe 166 is fluidly connected directly to the separate dedicated fluid supply source without being fluidly connected to effluent collector hopper cleaning system 164. As another alternative, pipe 166 of heat transfer element cleaning system 160 may be fluidly connected directly to fluid supply source 168, again without fluid connection to the effluent collector hopper cleaning system 164. The subject heat transfer element cleaning system 160 further includes a plurality of spaced apart nozzles 170 extending vertically upward from pipe 166 and in fluid connection with pipe 166. Each of the nozzles 170 include an orifice 172 through which fluid F, such as water, flows from fluid supply source 168, through pipe 166, through nozzles 170 and out from orifices 172 at a pressure of approximately 400 bar to approximately 700 bar or approximately 500 bar for approximately 1 minute to approximately 5 minutes per hour or approximately 2 minutes per hour for heat transfer element 134 cleaning. As such, pipe 166 is arranged within untreated flue gas outlet duct 118 for fluid F flow from nozzles 170 upwardly within closed passageways 146 to clean surfaces 134a of heat transfer elements 134 of accumulated substances deposited thereon primarily by and from the untreated flue gas FG flowing therethrough. Fluid F flowing upwardly from nozzles 170 into closed passageways 146 drains downwardly from closed passageways 146 carrying the accumulated substances into effluent collector hopper 162. As an alternative to or addition to pipe 166 being arranged within untreated flue gas outlet duct 118 for fluid F flow from nozzles 170 upwardly within closed passageways 146 to clean surfaces 134a of heat transfer elements 134, pipe 166 may be arranged or additionally arranged within untreated flue gas inlet duct 116 for fluid F flow from nozzles 170 downwardly within closed passageways 146 to clean surfaces 134a of heat transfer elements 134. Fluid F flowing downwardly from nozzles 170, or upwardly and downwardly from nozzles 170, into closed passageways 146 drains downwardly from closed passageways 146 carrying the accumulated substances into effluent collector hopper 162.

Figure 5:
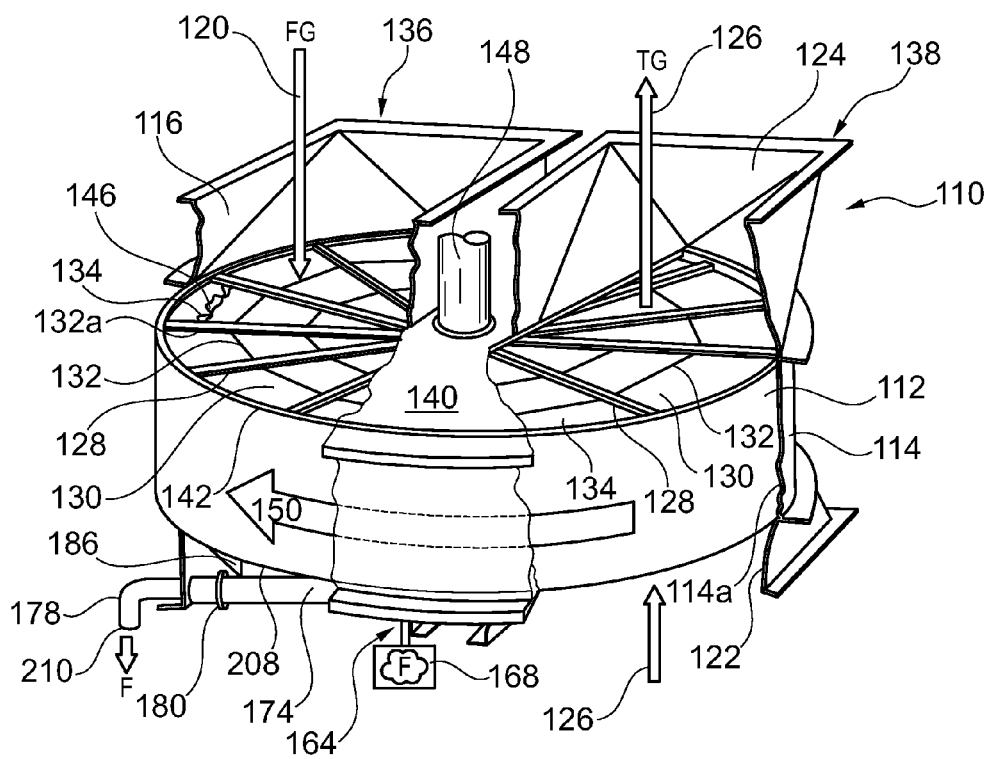
FIG. 5 is a partially broken away schematic perspective view of the heat transfer element cleaning system 160, effluent collector hopper 162 and effluent collector hopper cleaning system 164 of FIG. 4 in arrangement with the gas to gas heat exchanger 110 of FIG. 3 according to the subject disclosure.

Effluent collector hopper 162 includes an elongated duct 174 with a first closed end 176 and an opposed second closed end 178. Spaced apart on exterior 174a of elongated duct 174 are at least two support brackets 180. Support brackets 180 are used to support and to removably fix by using threaded attachment means (not shown) or like means therethrough, effluent collector hopper 162 below and at least partially within untreated flue gas outlet duct 118. Elongated duct 174 includes an open top channel 182 with opposed elongated sides 184 defined by opposed hopper walls 186 connected between opposed hopper ends 188. A first hopper end 190 of opposed hopper ends 188 may be formed unitarily with first closed end 176. Opposed hopper walls 186 extend upwardly and outwardly from open top channel 182. Accordingly, the distance between top edges 192 of opposed hopper walls 186 is greater than the distance between bottom attachment edges 194 of hopper walls 186 for an approximate 25 to 50 degree angle or approximately 34 degree angle between opposed hopper walls 186. Extending upwardly and inwardly toward open top channel 182 from second hopper end 196 of opposed hopper ends 188 is an end flange 198. End flange 198 has opposed side edges 200 fixedly attached to opposed side flanges 202. Opposed side flanges 202 likewise extend upwardly and inwardly toward open top channel 182 from opposed hopper walls 186. End flange 198 and connected opposed side flanges 202 are sized for top edge 204 of end flange 198 and top edges 206 of opposed side flanges 202 to be within a desired distance of heat transfer elements 134 for fluid F and accumulated substance capture therefrom. As best illustrated in FIG. 5, effluent collector hopper 162 is at least partially removably fixed within untreated flue gas outlet duct 118. Other alternative arrangements are possible, such as arranging the effluent collector hopper 162 to be removably fixed just below the untreated flue gas outlet duct 118 so that only opposed hopper walls 186 and opposed hopper ends 188 are arranged within flue gas outlet duct 118. Any such desired arrangement is possible so long as effluent collector hopper 162 captures fluid F and accumulated substances that flow downwardly from closed passages 146 between the heat transfer elements 134 following cleaning thereof for accumulated substance removal therefrom. Elongated duct 174 is arranged within or below untreated flue gas outlet duct 118 at approximately a 5 to 20 degree angle or approximately a 10 degree angle with respect to bottom 208 of rotor 112 and heat transfer elements 134. By arranging elongated duct 174 to have an approximately 5 to approximately 20 degree or approximately a 10 degree downward slope from first closed end 176 to opposed second closed end 178, fluid F and accumulated substances captured by effluent collector hopper 162 flow from first closed end 176 to opposed second closed end 178. At second closed end 178 is a drain or outlet port 210 for fluid F and accumulated substance drainage removal and treatment as necessary for disposal or use.

Effluent collector hopper cleaning system 164 includes a pipe 212 fluidly connected between fluid supply source 168 and elongated duct interior 174b passing through first closed end 176. Within elongated duct interior 174b, pipe 212 has a free end or nozzle 214. Fluid F, such as water, flows from fluid supply source 168 into elongated duct interior 174b via pipe 212 at a pressure of approximately 400 bar to approximately 700 bar or approximately 500 bar for approximately 1 minute to approximately 5 minutes per hour or approximately 2 minutes per hour to clean effluent collection hopper 162 to prevent clogging thereof. The fluid F spray from the heat transfer element cleaning system 160 and the fluid F spray from the effluent collector hopper cleaning system 164 may be controlled by valves (not shown) to operate as desired either sequentially or in unison depending on possible capacity constraints of fluid supply 168.

Tests have surprisingly shown that cleaning heat transfer elements 134 as herein disclosed, can reduce the pressure drop caused by accumulated substances significantly (about 14%) while maintaining the same rate of heat transfer and fluid FG/TG flow. This translates to a significant cost savings because reducing the pressure drop of the treated flue gas TG and the untreated flue gas FG as they flow through the exchanger 110 reduces the electrical power consumed by fans (not shown) used to force the treated flue gas TG and the untreated flue gas FG to flow through the exchanger 110.

A method of making a gas to gas heat exchanger 110 including the above-described features is also provided. The method comprises providing a gas to gas heat exchanger 110 equipped with element supporting baskets 132, and heat transfer elements 134 fabricated and sized from rigid material sheets for support within the element supporting baskets 132. The fabricated heat transfer elements 134 are arranged within the element supporting baskets 132 with a defined spacing between the heat transfer elements 134 to define closed passageways 146 for fluid F flow therethrough. Downstream with respect to the flow of untreated flue gas FG through the gas to gas heat exchanger 110 is a heat transfer element cleaning system 160, effluent collector hopper 162, and effluent collector hopper cleaning system 164. The heat transfer element cleaning system 160 is used to remove accumulated substances from the surfaces 134a of the heat transfer elements 134 and passageways 146 defined thereby thus reducing or avoiding any pressure drop otherwise caused by the accumulated substances. Associated with the heat transfer element cleaning system 160 is an effluent collector hopper 162 for collection of the accumulated substances cleaned or removed from the surfaces 134a of the heat transfer elements 134 and from passageways 146. The effluent collector hopper 162 is likewise equipped with an effluent collector hopper cleaning system 164 for cleaning of effluent collector hopper 162 and prevention of effluent collector hopper 162 clogging.

A method of using a gas to gas heat exchanger 110 is provided comprising providing a gas to gas heat exchanger 110 equipped with element supporting baskets 132. Within the element supporting baskets 132, heat transfer elements 134 are arranged to define closed passageways 146 for fluid FG/TG flow therethrough. As such, fluid FG/TG flows through the closed passageways 146 to transfer heat from untreated flue gas FG to treated flue gas TG prior to untreated flue gas FG treatment. Downstream with respect to the flow of untreated flue gas FG through the gas to gas heat exchanger 110 is a heat transfer element cleaning system 160, effluent collector hopper 162, and effluent collector hopper cleaning system 164. The heat transfer element cleaning system 160 is used to remove accumulated substances from the surfaces 134a of the heat transfer elements 134 and from passageways 146 thus reducing or avoiding any pressure drop otherwise caused by the accumulated substances. Associated with the heat transfer element cleaning system 160 is an effluent collector hopper 162 for collection of the accumulated substances cleaned or removed from the surfaces 134a of the heat transfer elements 134 and from passageways 146. The effluent collector hopper 162 is likewise equipped with an effluent collector hopper cleaning system 164 to prevent effluent collector hopper 162 clogging.

In summary, a gas to gas heat exchanger 110 is provided that comprises element supporting baskets 132 each supporting a plurality of heat transfer elements 134 arranged to define closed passageways 146 therebetween for fluid FG/TG flow therethrough, a heat transfer element cleaning system 160 equipped with a plurality of nozzles 170 fluidly connected to a fluid supply 168 arranged and operable for fluid F spray cleaning of accumulated substances from the heat transfer elements 134 and passageways 146, an effluent collector hopper 162 arranged and operable for collection of sprayed fluid F and accumulated substances removed from the heat transfer elements 134 and passageways 146, and an effluent collector hopper cleaning system 164 equipped with a drain 210 and fluidly connected to a fluid supply 168 operable for fluid F spray cleaning of the effluent collector hopper 162 for fluid F and accumulated substance drainage therefrom to clean effluent collector hopper 162 and to prevent effluent collector hopper 162 clogging. The fluid F from fluid supply 168 is preferably water. The fluid F spray of the heat transfer element cleaning system 160 is of a pressure of approximately 400 bar to approximately 700 bar utilized for approximately 1 minute to approximately 5 minutes per hour for heat transfer element 134 and passageway 146 cleaning. Preferably, the fluid F spray of the heat transfer element cleaning system 160 is of a pressure of approximately 500 bar utilized for approximately 2 minutes per hour for heat transfer element 134 and passageway 146 cleaning. The fluid F spray of the effluent collector hopper cleaning system 164 is of a pressure of approximately 400 bar to approximately 700 bar utilized for approximately 1 minute to approximately 5 minutes per hour for effluent collector hopper 162 cleaning to prevent clogging thereof. Preferably, the fluid F spray of the effluent collector hopper cleaning system 164 is of a pressure of approximately 500 bar utilized for approximately 2 minutes per hour for effluent collector hopper 162 cleaning to prevent clogging thereof.

A method of making a gas to gas heat exchanger 110 is also provided comprising providing a heat exchanger 110 equipped with element supporting baskets 132, fabricating from rigid material sheets heat transfer elements 134 for arrangement and support within the element supporting baskets 132 to define closed passageways 146 therebetween for fluid FG/TG flow therethrough, providing a heat transfer element cleaning system 160 equipped with a plurality of nozzles 170 fluidly connected to a fluid supply 168 arranged and operable for fluid F spray cleaning of accumulated substances from the heat transfer elements 134 and passageways 146, providing an effluent collector hopper 162 arranged and operable for collection of sprayed fluid F and accumulated substances removed from the heat transfer elements 134 and passageways 146, and providing an effluent collector hopper cleaning system 164 equipped with a drain 210 and fluidly connected to a fluid supply 168 operable for fluid F spray cleaning of the effluent collector hopper 162 for fluid F and accumulated substance drainage therefrom to clean and prevent effluent collector hopper 162 clogging. The fluid F from fluid supply 168 is preferably water. The fluid F spray of the heat transfer element cleaning system 160 is of a pressure of approximately 400 bar to approximately 700 bar utilized for approximately 1 minute to approximately 5 minutes per hour for heat transfer element 134 and passageway 146 cleaning. Preferably, the fluid F spray of the heat transfer element cleaning system 160 is of a pressure of approximately 500 bar utilized for approximately 2 minutes per hour for heat transfer element 134 and passageway 146 cleaning. The fluid F spray of the effluent collector hopper cleaning system 164 is of a pressure of approximately 400 bar to approximately 700 bar utilized for approximately 1 minute to approximately 5 minutes per hour for effluent collector hopper 162 cleaning to prevent clogging thereof. Preferably, the fluid F spray of the effluent collector hopper cleaning system 164 is of a pressure of approximately 500 bar utilized for approximately 2 minutes per hour for effluent collector hopper 162 cleaning to prevent clogging thereof.

Still further, a method of using a gas to gas heat exchanger 110 is provided comprising providing a heat exchanger 110 equipped with element supporting baskets 132, arranging heat transfer elements 134 within the element supporting baskets 132 to define closed passageways 146 therebetween for fluid FG/TG flow therethrough, passing fluids FG/TG of differing temperatures through the passageways 146 for heat transfer therebetween, using a heat transfer element cleaning system 160 equipped with a plurality of nozzles 170 fluidly connected to a fluid supply 168 arranged and operable for fluid F spray cleaning of accumulated substances from the heat transfer elements 134 and passageways 146, using an effluent collector hopper 162 arranged and operable for collection of sprayed fluid F and accumulated substances removed from the heat transfer elements 134 and passageways 146, and using an effluent collector hopper cleaning system 164 equipped with a drain 210 and fluidly connected to a fluid supply 168 operable for fluid F spray cleaning of the effluent collector hopper 162 for fluid F and accumulated substance drainage therefrom to clean and to prevent effluent collector hopper 162 clogging. The fluid F from the fluid supply is preferably water. The fluid F spray of the heat transfer element cleaning system 160 is of a pressure of approximately 400 bar to approximately 700 bar utilized for approximately 1 minute to approximately 5 minutes per hour for heat transfer element 134 and passageway 146 cleaning. Preferably, the fluid F spray of the heat transfer element cleaning system 160 is of a pressure of approximately 500 bar utilized for approximately 2 minutes per hour for heat transfer element 134 and passageway 146 cleaning. The fluid F spray of the effluent collector hopper cleaning system 164 is of a pressure of approximately 400 bar to approximately 700 bar utilized for approximately 1 minute to approximately 5 minutes per hour for effluent collector hopper 162 cleaning to prevent clogging thereof. Preferably, the fluid F spray of the effluent collector hopper cleaning system 164 is of a pressure of approximately 500 bar utilized for approximately 2 minutes per hour for effluent collector hopper 162 cleaning to prevent clogging thereof.

As noted briefly above, in other forms of heat exchangers from that of heat exchanger 10, the heat transfer elements 34 remain stationary while the untreated flue gas inlet duct 16/untreated flue gas outlet duct 18 and treated flue gas inlet duct 22/treated flue gas outlet duct 24 of housing 14 rotate. In such a case, the subject heat transfer element cleaning system 160, effluent collector hopper 162 for collection of the accumulated substances cleaned or removed from the surfaces 134a of the heat transfer elements 134, and effluent collector hopper cleaning system 164 for cleaning and prevention of effluent collector hopper 162 clogging rotate with the untreated flue gas outlet duct 18. As such, pipe 212 fluidly connected to fluid supply source 168 includes a coupling member 214 to allow for needed rotation. Like measures may likewise be implemented to accommodate collection of fluid F from outlet port 210.

While the subject exchanger 110 has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of this disclosure without departing from the essential scope thereof. Moreover, the use of the terms first, second, etc. do not denote any order or importance, but rather the terms first, second, etc. are used to distinguish one element from another. Therefore, it is intended that the disclosure not be limited to the particular embodiment disclosed as the best mode contemplated, but include all embodiments falling within the scope of the appended claims.

The invention claimed is:

1. A gas to gas heat exchanger comprising:
    element supporting baskets each supporting a plurality of heat transfer elements arranged to form closed passageways therebetween operable for fluid flow through the closed passageways;
    a heat transfer element cleaning system arranged within an untreated flue gas outlet duct of the heat exchanger, equipped with a plurality of nozzles fluidly connected to a fluid supply operable for an upward fluid spray cleaning of accumulated substances from the plurality of heat transfer elements and closed passageways and for downward drainage of the accumulated substances and sprayed fluid from the plurality of heat transfer elements and closed passageways;
    an effluent collector hopper arranged below the heat transfer element cleaning system and operable for collection of the downward drainage of sprayed fluid and accumulated substances removed from the plurality of heat transfer elements and closed passageways; and
    an effluent collector hopper cleaning system equipped with a drain and fluidly connected to a fluid supply operable for a horizontal fluid spray cleaning of the effluent collector hopper for fluid and accumulated substance drainage from the effluent collector hopper through the drain to clean and prevent effluent collector hopper clogging.

2. The exchanger of claim 1, wherein the fluid supply is water.

3. The exchanger of claim 1, wherein the upward fluid spray of the heat transfer element cleaning system is of a pressure of approximately 400 bar to approximately 700 bar for cleaning the plurality of heat transfer elements and closed passageways.

4. The exchanger of claim 1, wherein the upward fluid spray of the heat transfer element cleaning system is of a pressure of approximately 500 bar for cleaning the plurality of heat transfer elements and closed passageways.

5. The exchanger of claim 1, wherein the horizontal fluid spray of the effluent collector hopper cleaning system is of a pressure of approximately 400 bar to approximately 700 bar for effluent collector hopper cleaning system cleaning to prevent clogging thereof.

\* \* \* \* \*